US010563403B1

(12) United States Patent
Almusallam et al.

(10) Patent No.: US 10,563,403 B1
(45) Date of Patent: Feb. 18, 2020

(54) MULTI-LEG FIBER REINFORCED CONCRETE (71) Applicant: KING SAUD UNIVERSITY, Riyadh (SA)

(72) Inventors: Tarek H. Almusallam, Riyadh (SA); Husain Abbas, Riyadh (SA); Yousef A. Al-Salloum, Riyadh (SA); Aref A. Abadel, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/175,248

(22) Filed: Oct. 30, 2018

(51) Int. Cl.
E04C 5/07 (2006.01)
C04B 14/48 (2006.01)
C04B 28/04 (2006.01)
C04B 20/00 (2006.01)

(52) U.S. Cl.
CPC .............. *E04C 5/073* (2013.01); *C04B 14/48* (2013.01); *C04B 20/0068* (2013.01); *C04B 28/04* (2013.01); *E04B 2103/02* (2013.01)

(58) Field of Classification Search
CPC ..... E04C 5/073; C04B 20/0068; C04B 28/04; C04B 14/48; E04B 2103/02
See application file for complete search history.

(56) References Cited

U.S. PATENT DOCUMENTS 3,852,930 A * 12/1974 Naaman .................. E04C 5/012
52/664
3,953,953 A 5/1976 Marsden
4,233,364 A * 11/1980 van Thiel ................ E04C 5/012
428/399
4,585,487 A 4/1986 Destree et al.
5,215,830 A * 6/1993 Cinti ....................... B21B 1/163
106/644
5,981,630 A 11/1999 Banthia et al.
6,045,910 A * 4/2000 Lambrechts ............ E04C 5/012
428/399
6,197,401 B1 3/2001 Ahn
6,340,522 B1 1/2002 Burke et al.
(Continued)

FOREIGN PATENT DOCUMENTS

AT 389550 B 12/1989
EP 0132254 A2 1/1985
(Continued)

*Primary Examiner* — Basil S Katcheves
*Assistant Examiner* — Omar F Hijaz
(74) *Attorney, Agent, or Firm* — Richard C. Litman; Nath, Goldberg & Meyer (57) ABSTRACT The multi-leg fiber reinforced concrete is concrete in which fibers have been embedded to prevent the concrete from being fractured due to cracks developing therein. Each fiber has multiple legs, defining two and three dimensional structures. At least one fiber is embedded in a volume of concrete, where the at least one fiber has at least first and second legs respectively extending along first and second directions. The first and second directions are angularly oriented with respect to one another between 45° and 135°, with each of the first and second legs having a free end and a fixed end. Each free end has a substantially Z-shaped contour. The fixed ends of the first and second legs may be joined together to define a two-dimensional fiber structure. The at least one fiber may be partially coated with a polymeric material, such as polypropylene.

3 Claims, 11 Drawing Sheets (56) References Cited

U.S. PATENT DOCUMENTS

| | | | |
|---|---|---|---|
| 8,962,150 B2 * | 2/2015 | Lambrechts | E04C 5/012 |
| | | | 428/606 |
| 2007/0261354 A1 * | 11/2007 | Chang | E04C 5/012 |
| | | | 52/600 |
| 2010/0237158 A1 * | 9/2010 | Hou | C04B 28/08 |
| | | | 238/264 |
| 2014/0060392 A1 * | 3/2014 | Koenigstein | C04B 20/0068 |
| | | | 106/802 |

FOREIGN PATENT DOCUMENTS

| | | |
|---|---|---|
| EP | 1301670 B1 | 10/2012 |
| JP | 2016183503 A | 10/2016 |
| WO | 0155046 A2 | 8/2001 |

* cited by examiner

MULTI-LEG FIBER REINFORCED CONCRETE

BACKGROUND

1. Field

The disclosure of the present patent application relates to reinforced concrete, and particularly to concrete reinforced with multi-leg fibers forming two and three dimensional shapes for enhancing the tensile strength of the concrete.

2. Description of the Related Art

Concrete, which is widely used in the fields of civil-engineering and architecture, is relatively brittle on its own, allowing it to be easily fractured by tensile load or dynamic load. Thus, plain concrete is susceptible to the formation and growth of cracks therein. In order to resolve these drawbacks of concrete (i.e., in order to improve its tensile strength), fiber reinforced concrete (FRC) has been developed. In conventional FRC, a plurality of linear strands of fiber are disbursed in the concrete, typically using a somewhat random distribution such that the strands cover, for all intents and purposes, every orientation within the concrete, ideally with even distribution.

Although easy to manufacture, conventional FRC is not ideal. Linear fiber strands, for example, do not provide crack resistance when cracks arise near or pass through the fiber ends. In addition, flexible fibers frequently clump together during mixing. Thus, multi-leg fiber reinforced concrete solving the aforementioned problems is desired.

SUMMARY

The multi-leg fiber reinforced concrete is concrete in which fibers have been embedded to prevent the concrete from being fractured due to cracks developing therein. Each fiber has multiple legs, defining two and three dimensional structures. At least one fiber is embedded in a volume of concrete, where the at least one fiber has at least first and second legs respectively extending along first and second directions. The first and second directions are angularly oriented with respect to one another between 45° and 135°, with each of the first and second legs having a free end and a fixed end. Each free end has a substantially Z-shaped contour. The fixed ends of the first and second legs may be joined together to define a two-dimensional fiber structure. The at least one fiber may be partially coated with a polymeric material, such as polypropylene.

In an alternative embodiment, the at least one fiber further includes a third leg, having opposed first and second ends. The first end thereof is joined to the fixed end of the first leg, and the second end thereof is joined to the fixed end of the second leg. The third leg extends along a third direction, where the third direction is angularly oriented with respect to each of the first and second directions between 45° and 135°. In this embodiment, a first plane, defined by the first direction and the third direction, is orthogonal to a second plane, defined by the second direction and the third direction.

In a further alternative embodiment, the at least one fiber further includes a third leg, a fourth leg, a fifth leg and a sixth leg, with each leg having opposed first and second ends. The first end of the third leg is joined to the fixed end of the first leg, and the second end of the third leg is joined to the first end of the fourth leg. Similarly, the second end of the fourth leg is joined to the first end of the fifth leg, and the second end of the fifth leg is joined to the first end of the sixth leg. The second end of the sixth leg is joined to the fixed end of the second leg. The third, fourth, fifth and sixth legs respectively extend along third, fourth, fifth and sixth directions, where each of the first, second, third, fourth, fifth and sixth directions are angularly oriented with respect to one another between 45° and 135°.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
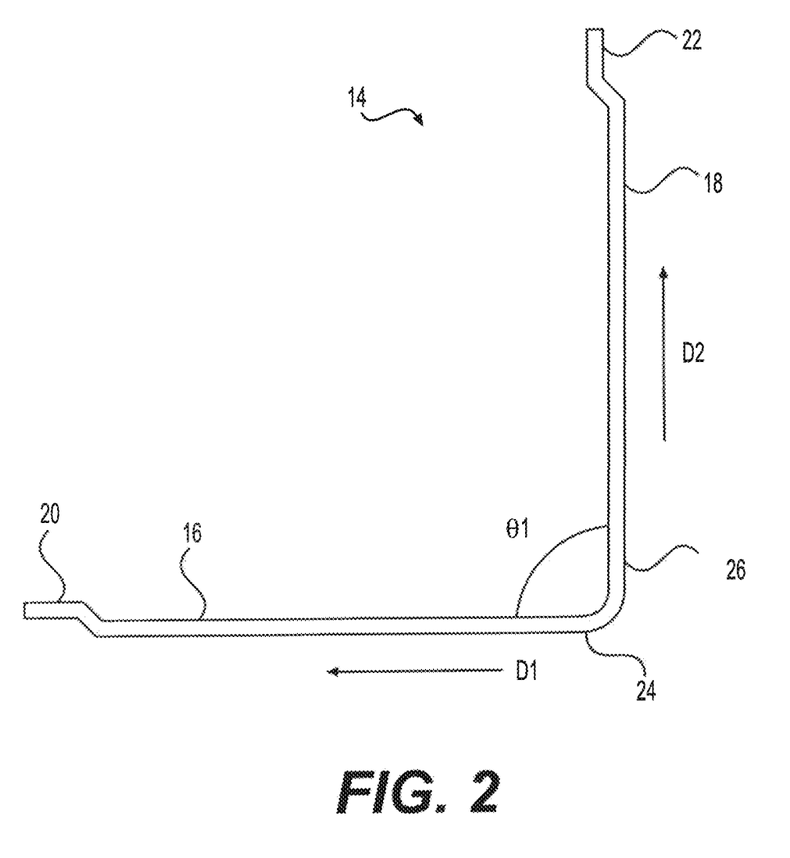
FIG. 2 is a side view of an alternative multi-leg fiber of the multi-leg fiber reinforced concrete.
Figure 11:
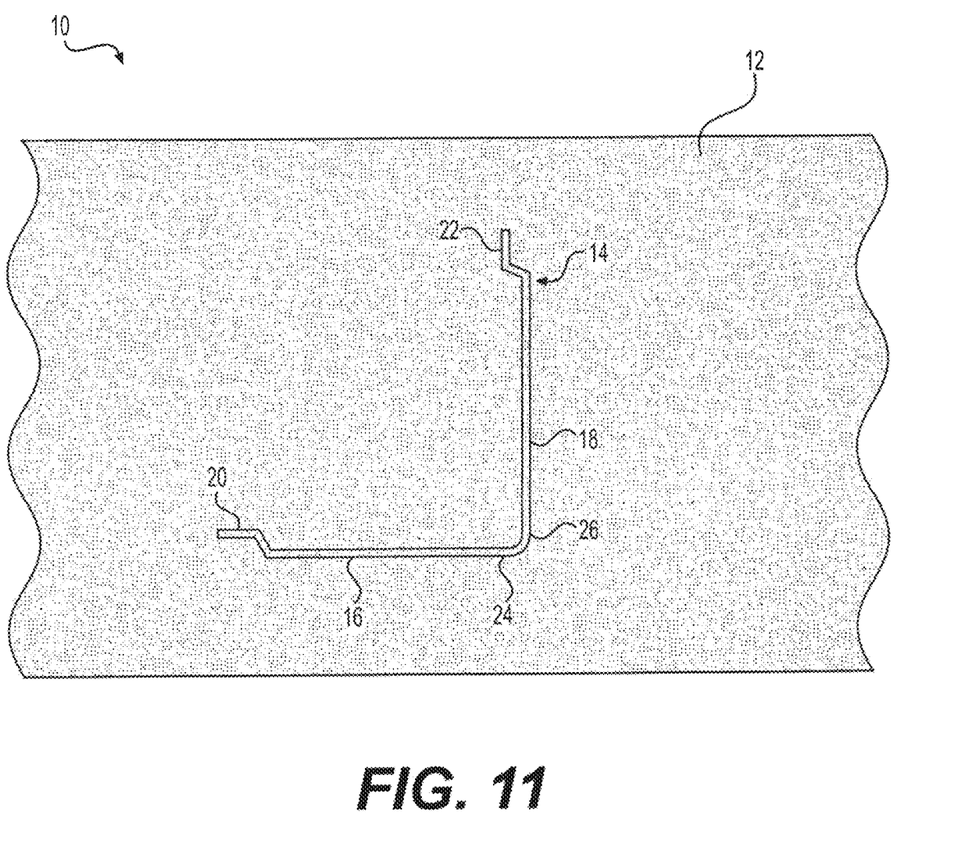
FIG. 11 is a partial view in section of multi-leg fiber reinforced concrete with the alternative multi-leg fiber of FIG. 2.

As shown in FIG. 11, the multi-leg fiber reinforced concrete 10 includes concrete 12 and fibers 14 embedded in the concrete 12 to prevent the concrete 12 from being fractured due to cracks developing therein. As shown in FIGS. 11 and 2, at least one fiber 14 is embedded in a volume of concrete 12, where the at least one fiber 14 has at least first and second legs 16, 18 respectively extending along first and second directions D1, D2, respectively. The first and second directions are angularly oriented with respect to one another between 45° and 135°, as indicated by angle θ1 in FIG. 2. Each of the first and second legs 16, 18 has a free end 20, 22, respectively, and a fixed end 24, 26, respectively. As shown, each free end 20, 22 has a substantially Z-shaped contour. The fixed ends 24, 26 of the first and second legs 16, 18, respectively, may be joined together to define a two-dimensional fiber structure, as shown in FIGS. 11 and 2. In FIGS. 11 and 2, the angle θ1 is shown as approximately 90°, however, it should be understood that this right angle is shown for exemplary purposes only. As noted above, angle θ1 may be between 45° and 135°.

It should be understood that a large number of fibers 14 would ordinarily be mixed into the concrete 12, and that FIG. 11 shows only an enlarged or magnified view of a single fiber 14 for purposes of illustration and clarity. In actuality, given that fibers 14 are relatively small, a very large number of them would be mixed into, and distributed throughout, the concrete 12. A typical exemplary weight percentage of fibers 14 in the overall multi-leg fiber reinforced concrete 10 is about 0.2 wt % to about 5.0 wt %. Further, it should be understood that the fibers 14 may be formed from any suitable type of reinforcing material, such as, for example, steel, polyvinyl alcohol (PVA), polypropylene, Kevlar® or the like.

It should be further understood that the cross-section of each fiber 14 may have any suitable contouring, such as, for example, circular or rectangular. It should be further understood that the overall configuration of each fiber leg may have any suitable shape or orientation, such as, for example, twisted fiber, crimped fiber, sinusoidal fiber, braided fiber or the like. Braiding, in particular, improves the outer surface of the fibers for the development of better bonds with the concrete. Further, fibers 14 may be formed from the braiding of two or more differing types of fiber and/or materials, thus providing different types of fibers at the same location. It should be further understood that fibers 14 may be glued together, or otherwise adhered together, to form bundles of fibers, allowing for compact packaging and transportation of the fibers. This will also aid in providing uniform dispersion of fibers 14 in the concrete 12, as the fibers 14 will become separated when the fiber bundles come in contact with water during mixing of the concrete.

Figure 5:
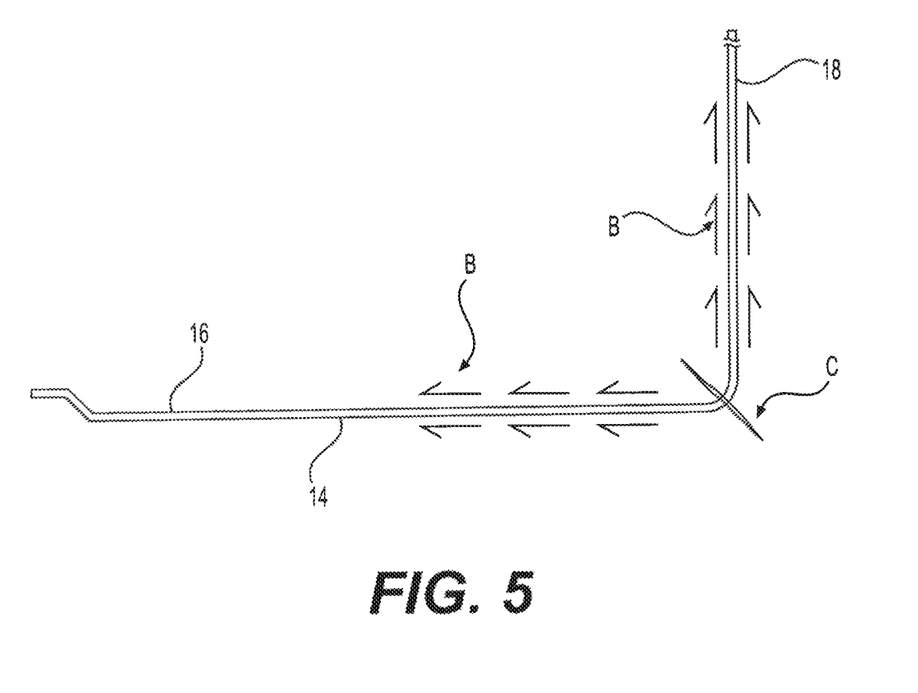
FIG. 5 diagrammatically illustrates the multi-leg fiber of the multi-leg fiber reinforced concrete of FIG. 2 resisting a crack forming in the concrete across a bend of the multi-leg fiber.
Figure 6:
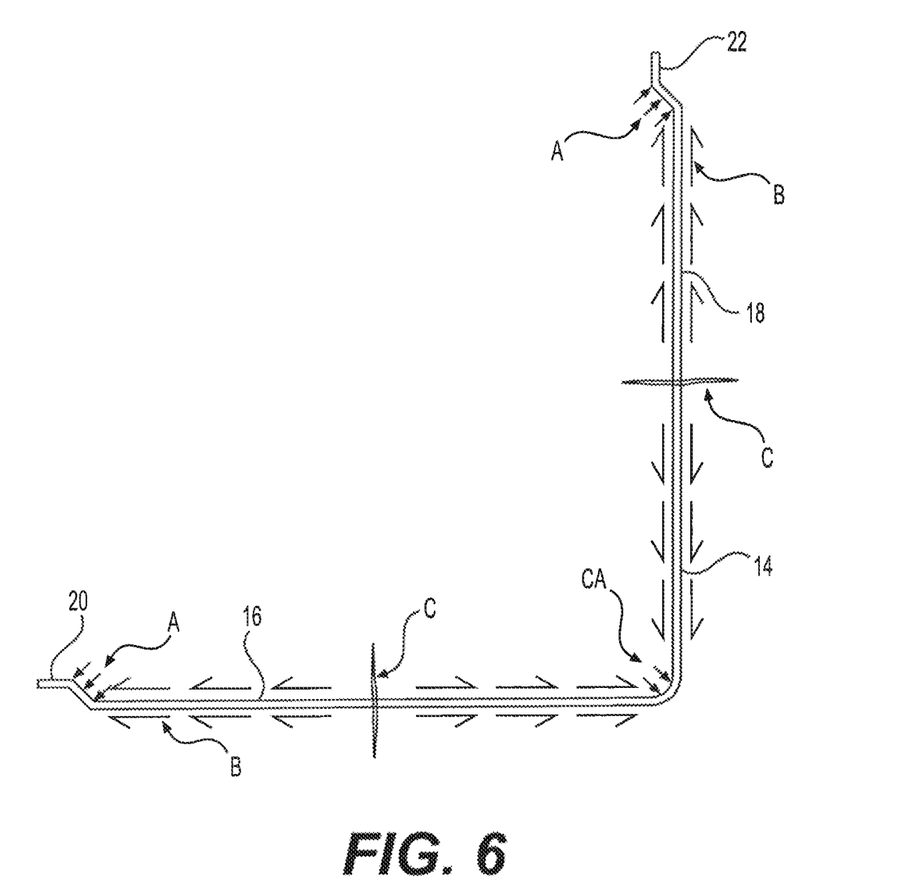
FIG. 6 diagrammatically illustrates the multi-leg fiber of the multi-leg fiber reinforced concrete of FIG. 2 resisting a crack forming in the concrete across a midpoint of a leg of the multi-leg fiber.

As shown in FIGS. 5 and 6, fibers 14 provide resistance to some of the cracks C, typical of cracks formed in concrete, which cross fibers 14, even through their bent regions (i.e., their anchorage zones). This ability is notable, since conventional straight fibers cannot resist any type of crack passing through the end anchorages. In FIG. 5, the crack C is shown passing through the bent region of fiber 14. Here, the bond force is indicated generally as B.

Figure 3:
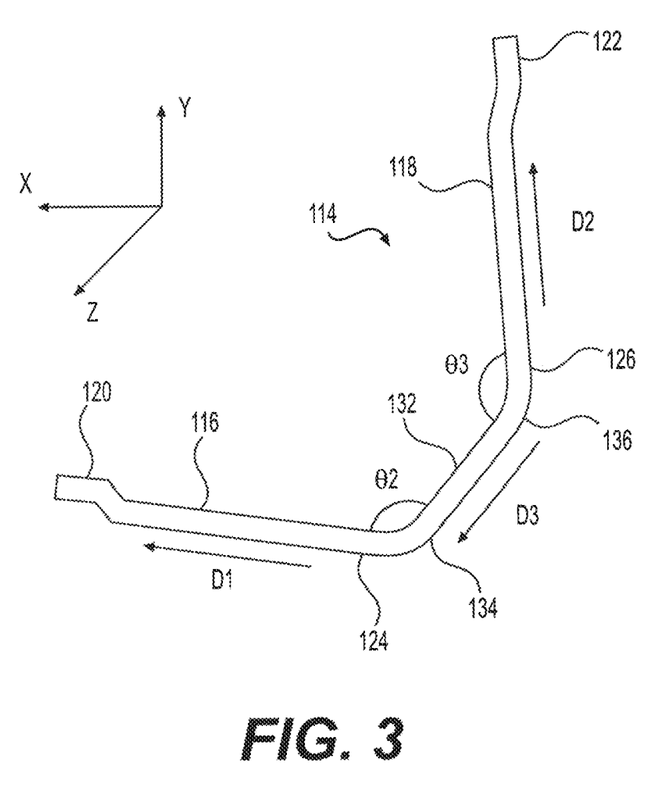
FIG. 3 is a perspective view of a multi-leg fiber of the multi-leg fiber reinforced concrete.
Figure 4:
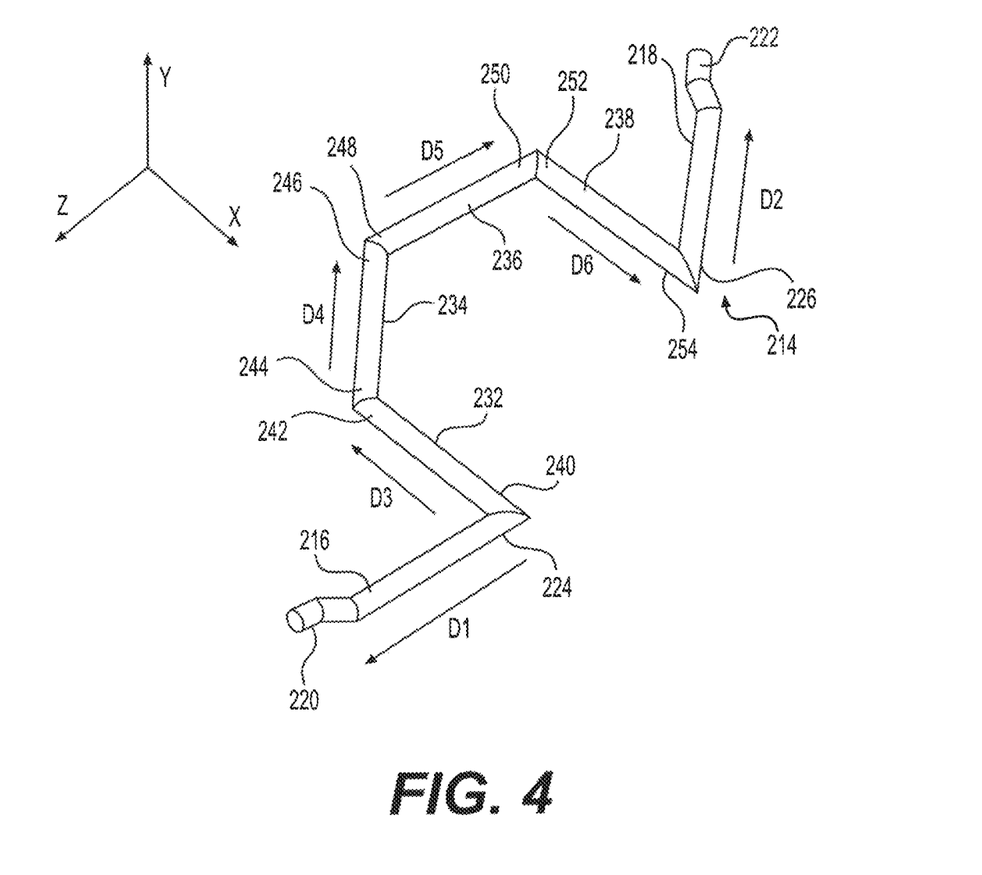
FIG. 4 is a perspective view of another alternative embodiment of the multi-leg fiber of the multi-leg fiber reinforced concrete.

In the example of FIG. 6, cracks C are shown formed approximately midway through each of legs 16, 18. Here, the common anchorage (CA) is formed at the bent point of joining between legs 16 and 18. Compared to conventional straight fibers, fiber 14 can be seen to save the waste of fiber material in conventional end anchorages because the anchorage is inherently provided by the continuity of fibers through the change in direction at the bend; i.e., CA provides anchorage to both of legs 16 and 18. The direction of the bond force B is reversed around each crack C to resist crack opening. The saving in the end anchorages for fibers 14 is 50%. As will be discussed in greater detail below, FIG. 3 shows a three-leg fiber embodiment, in which the corresponding savings is 66.7%. As will be further discussed in greater detail below, FIG. 4 shows a six-leg fiber embodiment, in which the corresponding savings is 83.3%. Returning to FIG. 6, the anchorage force at the Z-shaped ends 20, 22 is indicated generally by A.

As shown, the bend at common anchorage point CA in fiber 14 adds to anchorages A, thus allowing the portion of each leg which lies in an uncracked zone to contribute to resisting cracks in the adjoining leg by adding to the anchorage strength. When concrete cracks, the legs of fibers crossing the cracks C resist the opening of cracks C, as shown in FIG. 6. Returning to FIG. 5, when the bends of fibers 14 cross the cracks C, the fibers 14 provide delayed resistance after slight straightening of the bends. This delayed resistance aids in providing resistance, even when the cracks C become relatively wide.

Figure 7:
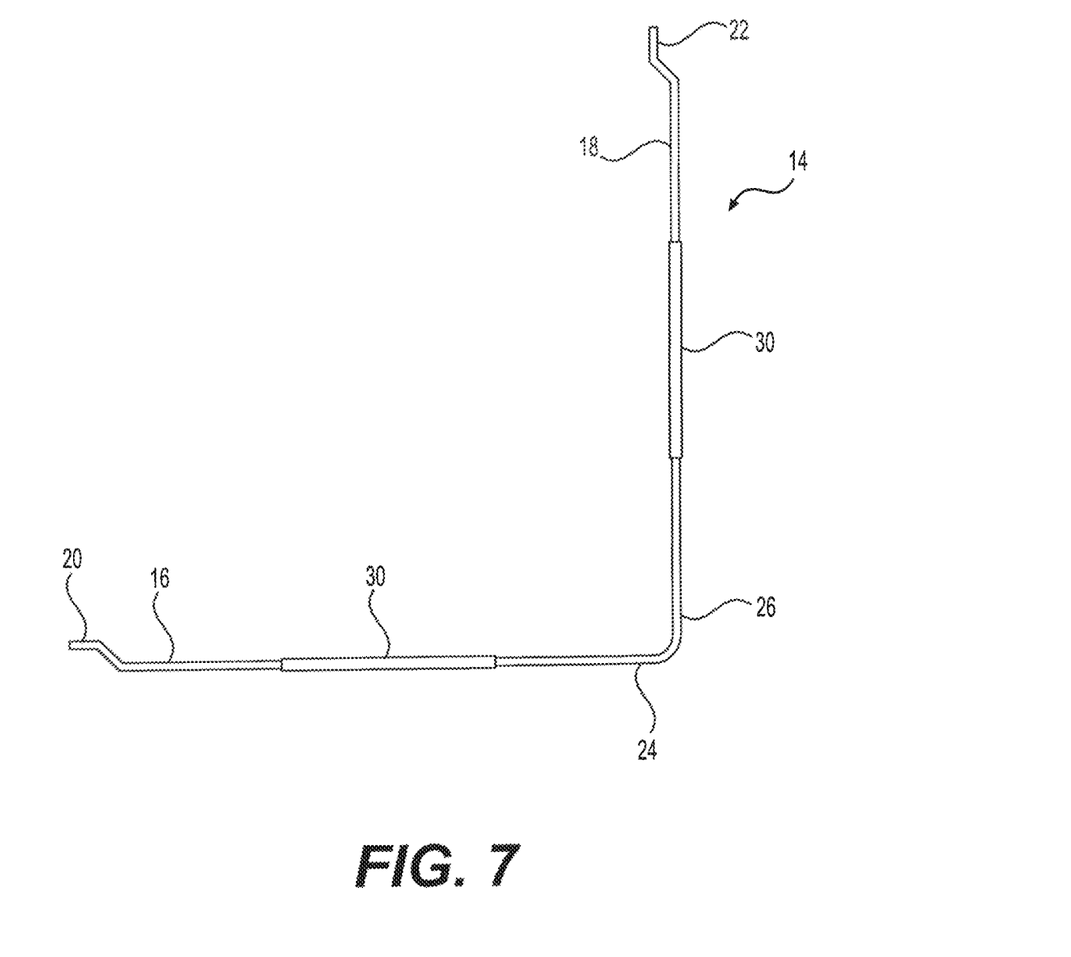
FIG. 7 is a side view of another alternative embodiment of the multi-leg fiber of the multi-leg fiber reinforced concrete.
Figure 8:
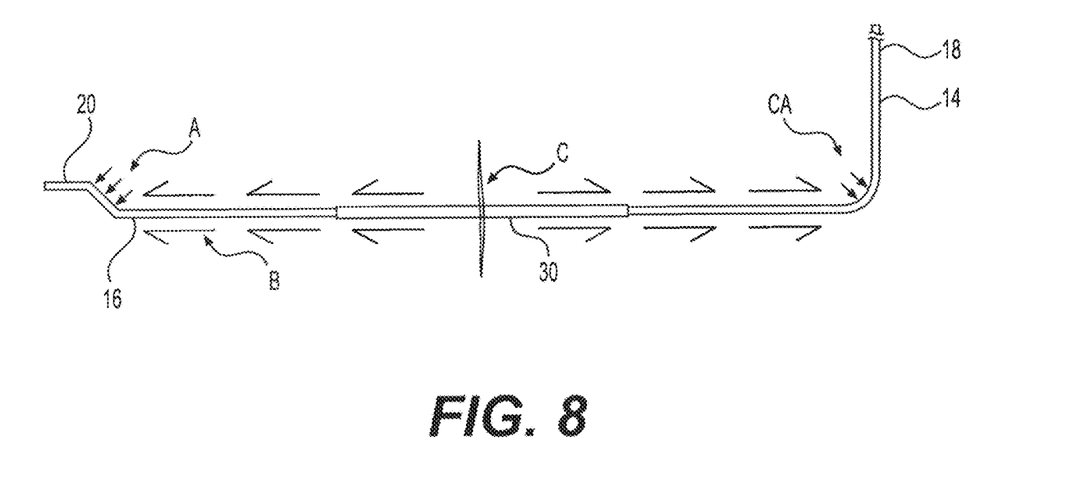
FIG. 8 diagrammatically illustrates the multi-leg fiber of FIG. 7 resisting a crack forming in the concrete across a midpoint of a leg of the multi-leg fiber.
Figure 9:
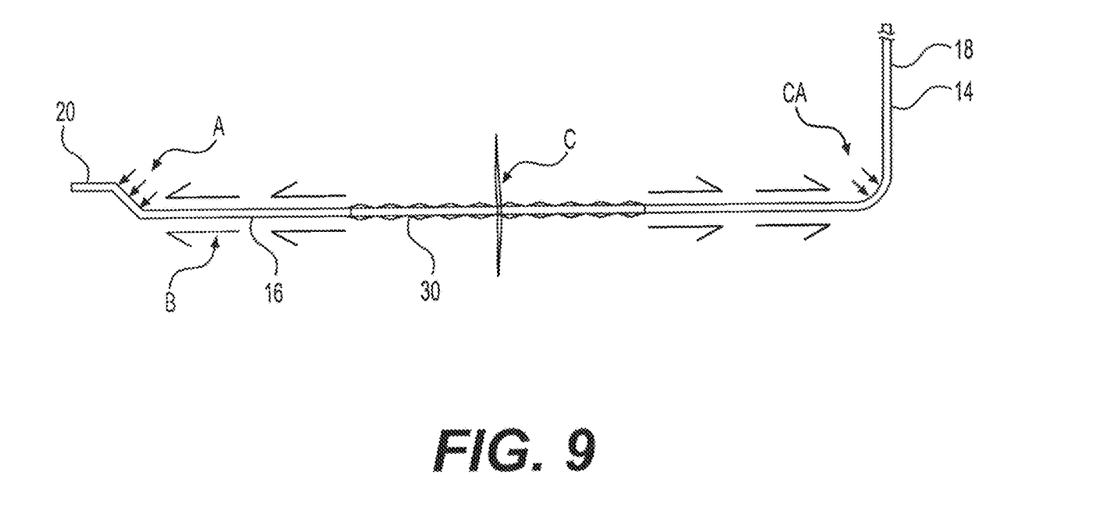
FIG. 9 diagrammatically illustrates the multi-leg fiber of FIG. 7 resisting a crack forming in the concrete across a midpoint of a leg of the multi-leg fiber, following exposure of the concrete to fire.

As shown in FIG. 7, the at least one fiber 14 may be partially coated with a polymeric material 30, such as polypropylene. FIG. 8 shows such a fiber 14 with a crack C formed midway through leg 16, similar to FIG. 6, as described above. Although there is a reduction in bond between the polymeric material and concrete, as compared to the bond between steel and concrete, this is compensated to a great extent by the increased surface area of the polymeric material. In the event of fire, melting of the polymeric material 30 provides passages for the escape of water vapor and other gases, thus avoiding bursting of the concrete. Additionally, the polymeric coating 30 compensates for any loss of strength in the fiber 14, due to the fire or other heated conditions, through development of additional stress in the fiber 14. FIG. 9 illustrates the melted polymeric coating 30, following fire conditions, with a reduced or zero bond in the region of melted polymeric coating 30. The remaining bond force B, near anchorage point 20, is also reduced, and the anchorage force A is enhanced to compensate for the loss of bond force B.

Figure 1:
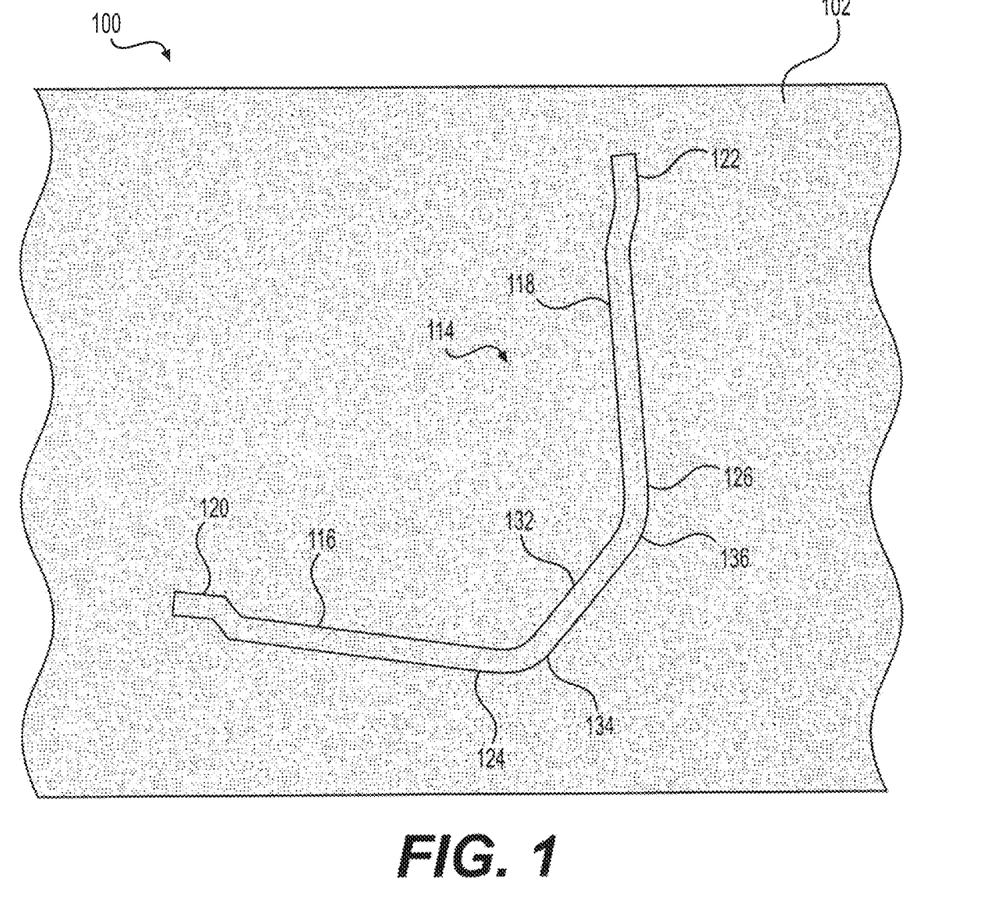
FIG. 1 is a partial view in section of multi-leg fiber reinforced concrete.

In the alternative embodiment of FIG. 3, a third leg 132 has been added to fiber 114. Fiber 114, similar to fiber 14 described above, has first and second legs 116, 118 respectively extending along first and second directions D1, D2, respectively. Third leg 132 extends along third direction D3. The first and third directions are angularly oriented with respect to one another between 45° and 135°, as indicated by angle θ2 in FIG. 3. The second and third directions are angularly oriented with respect to one another between 45° and 135°, as indicated by angle θ3. Each of the first and second legs 116, 118 has a free end 120, 122, respectively, and a fixed end 124, 126, respectively. As shown, each free end 120, 122 has a substantially Z-shaped contour, similar to the previous embodiment. FIG. 1, similar to that described above with respect to FIG. 11, shows fiber 114 embedded in concrete 102 to form overall multi-leg fiber reinforced concrete 100. Similar to the previous embodiment, it should be understood that a large number of fibers 114 would ordinarily be mixed into the concrete 102, and that FIG. 11 shows only an enlarged or magnified view of a single fiber 114 for purposes of illustration and clarity. In actuality, given that fibers 114 are relatively small, a very large number of them would be mixed into, and distributed throughout, the concrete 102. A typical exemplary weight percentage of fibers 114 in the overall multi-leg fiber reinforced concrete 100 is about 0.2 wt % to about 5.0 wt %.

In the embodiment of FIG. 3, a first end 134 of third leg 132 is joined to the fixed end 124 of the first leg 116. A second end 136 of third leg 132 is joined to the fixed end 126 of the second leg 118. As indicated by the three-dimensional X-Y-Z Cartesian axes in FIG. 3, fiber 114 may be a three-dimensional structure. In the exemplary configuration of FIG. 3, direction D3 extends along the Z-axis, direction D1 points within the X-Z plane, and direction D2 points within the Y-Z plane. In FIG. 3, the angles θ2 and θ3 are shown as being approximately 90°, corresponding approximately to the X-Y-Z Cartesian axes, however, it should be understood that these right angles are shown for exemplary purposes only. As noted above, angles θ2 and θ3 may each be between 45° and 135°. In this embodiment, as can be seen in FIG. 3, even if one or both of angles θ2 or θ3 are varied from 90°, a first plane, defined by the first direction D1 and the third direction D3, remains orthogonal to a second plane, defined by the second direction D2 and the third direction D3. However, it should be understood that the direction D1 may be such that it does not lie within the X-Z plane. Similarly, the direction D2 may be such that it does not lie within the Y-Z plane.

In the further alternative embodiment of FIG. 4, third, fourth, fifth and sixth legs 232, 234, 236, 238 have been added to fiber 214. Fiber 214, similar to fiber 14, has first and second legs 216, 218 respectively extending along first and second directions D1, D2, respectively. Third, fourth, fifth and sixth legs 232, 234, 236, 238 respectively extend along directions D3, D4, D5 and D6. Each of the first, second, third, fourth, fifth and sixth directions D1, D2, D3, D4, D5 and D6 are angularly oriented with respect to one another between 45° and 135°. As in the previous embodiments, each of the first and second legs 216, 218 has a free end 220, 222, respectively, and a fixed end 224, 226, respectively. As shown, each free end 220, 222 has a substantially Z-shaped contour, similar to the previous embodiment.

The first end 240 of the third leg 232 is joined to the fixed end 224 of the first leg 216, and the second end 242 of the third leg 232 is joined to the first end 244 of the fourth leg 234. Similarly, the second end 246 of the fourth leg 234 is joined to the first end 248 of the fifth leg 236, and the second end 250 of the fifth leg 236 is joined to the first end 252 of the sixth leg 238. The second end 254 of the sixth leg 238 is joined to the fixed end 226 of the second leg 218. Similar to the embodiment of FIG. 3, each bend is shown as having an angle of approximately 90°, corresponding approximately to the X-Y-Z Cartesian axes, however, it should be understood that these right angles are shown for exemplary purposes only. It should be understood that, similar to the previous embodiments, each bend may have an angle between 45° and 135°.

Figure 10:
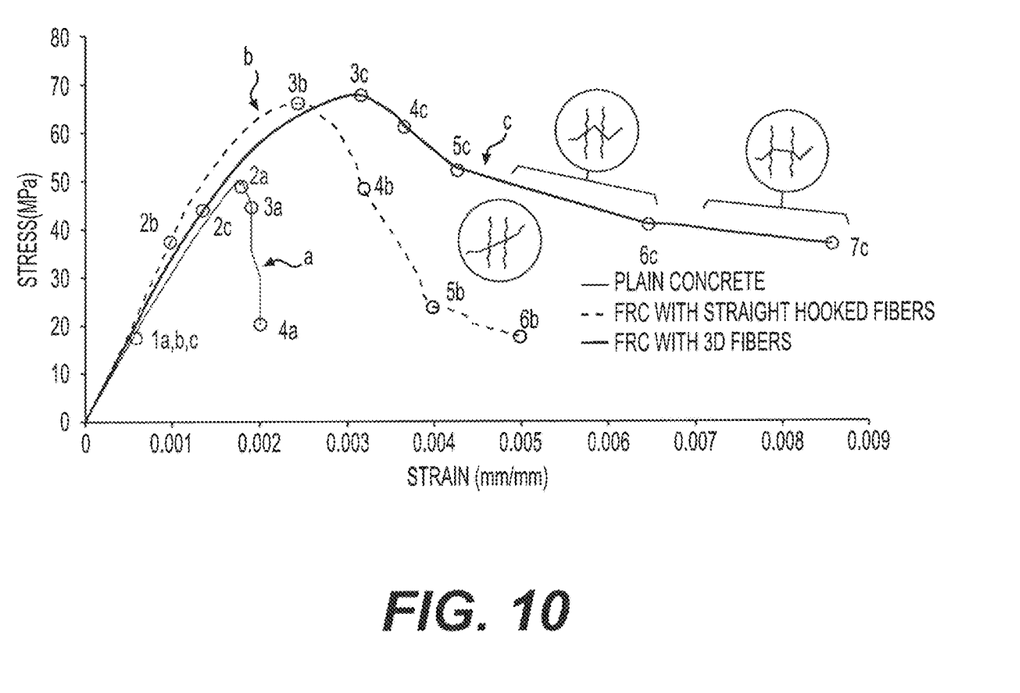
FIG. 10 is a stress-strain graph comparing a plain concrete sample (curve a) against a fiber reinforced concrete sample prepared with conventional straight, hooked-end fibers (curve b), and a fiber reinforced concrete sample prepared with the multi-leg fibers of FIG. 3.

In experiments, fibers 114 were tested (corresponding to curve c in FIG. 10), compared against plain concrete (corresponding to curve a in FIG. 10) and conventional hooked straight fibers (corresponding to curve b in FIG. 10). Locally available aggregates (both fine and coarse) were used. To conform with the grading requirements of ASTM C33, the fine aggregate was obtained by mixing silica sand and crushed sand. The ratio of silica sand and crushed sand was taken as 2. The physical properties of the fine and coarse aggregates are given below in Table 1. The experimental samples were in the form of standard concrete cylinders (150 mm×300 mm) and were tested under compression. The mix proportion of the plain concrete is given below in Table 2. Ordinary Portland cement (OPC) was used. For curve b of FIG. 10, fiber reinforced concrete was produced using steel fibers with lengths of 20 mm. The fibers 114 were produced with each of the three legs having a length of 20 mm. Each tested sample had the same fiber diameter and was formed from identical steel samples having a tensile strength of 1000 MPa. The end hooks in the two fiber types had the same dimensions. The volume of fibers in concrete was 0.6% (i.e., 1.96% by weight). The specimens were tested under compression after 28 days of curing by immersion in water.

TABLE 1

Material Properties

| Property | Value |
|---|---|
| Cement | |
| Specific gravity | 3.15 |
| Blaine's fineness, $cm^2/g$ | 2450 |
| Standard consistency | 29% |
| Initial setting time, min. | 110 |
| Final setting time, min. | 177 |
| Coarse Aggregate | |
| Maximum size of aggregate, mm | 10 |
| Fineness modulus | 6.65 |
| Specific gravity | 2.67 |
| Water absorption | 1.45% |
| Grading | Conforming to ASTM C33 |
| Fine Aggregate | |
| Maximum size of aggregate, mm | 4.75 |
| Fineness modulus | 2.36 |
| Specific gravity | 2.78 |
| Water absorption | 0.9% |
| Grading | Conforming to ASTM C33 |

TABLE 2

Plain Concrete Mix

| Material | Weight ($kg/m^3$) |
|---|---|
| Cement | 650 |
| Crushed sand | 264 |
| Silica sand | 528 |
| Coarse aggregate (Nominal size = 10 mm) | 770 |
| Water (water cement ratio = 0.40) | 260 |
| Gli-110 (Super-plasticizer) | 19.5 |

As shown in the stress-strain diagrams of FIG. 10, as expected, the addition of steel fibers (curves b and c) causes an increase in the compressive strength and introduces ductility in the concrete. However, the increase in the compressive strength of curve c is due to the improved distribution of fibers 114, as well as the decrease in wastage of steel in the Z-shaped end hooks. With regard to curve a (i.e., the plain concrete), point 1a in FIG. 10 shows the initiation of micro-cracking in the concrete. Point 2a represents the peak load, and point 3a shows widening/separation of the cracks. Point 4a is the point of failure.

In curve b (i.e., the conventional straight fibers with hooked ends), point 1b shows the fibers starting to resist the micro-cracks, with the initiation of micro-cracking in the concrete appearing at point 2b. Point 3b represents the peak load and point 4b shows the steel fibers starting to resist macro-cracks in the concrete. Point 5b is the initiation of fiber pull out and/or fracture, and failure by fracture or pull out of the fibers occurs at point 6b. In curve c (i.e., fibers 114), the fibers start resisting micro-cracks at point 1c. Initiation of micro-cracking in the concrete occurs at point 2c, and point 3c represents peak load. The fibers 114 start resisting macro-cracks at point 4c, and the fiber-bends in the crack zone start straightening at point 5c. The initiation of fiber pull out and/or fracture of straight fibers crossing a crack, and straightened fibers starting to get stressed, occurs at point 6c, and point 7c shows the point of failure by fracture or pull out of the straightened fibers.

The zone 3b-4b in curve b indicates that the crack opening is being resisted by the steel fibers. Its equivalent in curve c is the zone 3c-5c, which shows that the crack opening is being resisted by the straight portion of one of the legs of the steel fibers crossing a crack. The improved characteristics of curve c, which are responsible for enhanced ductility, are demonstrated by the presence of zones 5c-6c and 6c-7c, which respectively indicate straightening of fiber bends falling in crack zones and the resistance provided by these straightened bends to further crack opening.

In the above, uniaxial compression tests were performed on the cylindrical test specimens at 28 days, in accordance with ASTM C39. The specimens were tested to failure using a displacement controlled compression testing machine with a 3000 kN capacity, manufactured by Tonitek of Germany. The rate of increase of the displacement was 0.3 mm/min. A compressometer with three linear variable displacement transducers (LVDTs) was used to measure the axial compression on the middle-half height of the cylinders. The load and dial gauge readings were recorded using a data logger. The load-deformation data was used to calculate the axial stress as $\sigma=P/A$, where a is the axial stress (in MPa), P is the load (in N), and A is the cross-section of the cylinder (in mm). The corresponding strain was calculated as $\varepsilon=\delta/L$, where E is the axial strain (in mm/mm), $\delta$ is the axial compression (in mm), and L is the gauge length (in mm).

It is to be understood that the multi-leg fiber reinforced concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A multi-leg fiber reinforced concrete, comprising:
a volume of concrete; and
at least one fiber embedded in the volume of concrete, wherein the at least one fiber consists of a first leg, a second leg, and an intermediate third leg respectively extending along first, second, and third distinct directions, the first and second directions being angularly oriented with respect to one another between 45° and 135°, each of the first and second legs having a free end and a fixed end, each of the free and fixed ends are connected by a straight portion of the fiber, each of the free ends having a substantially Z-shaped contour, wherein the third leg has opposed first and second ends, the first end thereof being joined to the fixed end of the first leg, the opposed second end thereof being joined to the fixed end of the second leg, the third leg being configured as a straight portion of the fiber and extending along the third distinct direction, the third distinct direction being angularly oriented with respect to each of the first and second directions between 45° and 135°, further wherein a first plane defined by the first direction and the third direction is orthogonal to a second plane defined by the second direction and the third direction.

2. The multi-leg fiber reinforced concrete as recited in claim 1, wherein the fixed end of the first leg is joined to the fixed end of the second leg.

3. The multi-leg fiber reinforced concrete as recited in claim 1, wherein the at least one fiber comprises braided fiber.

* * * * *